Jan. 28, 1936. I. HECHENBLEIKNER Re. 19,837
NITRIC ACID CONCENTRATION
Original Filed April 3, 1929
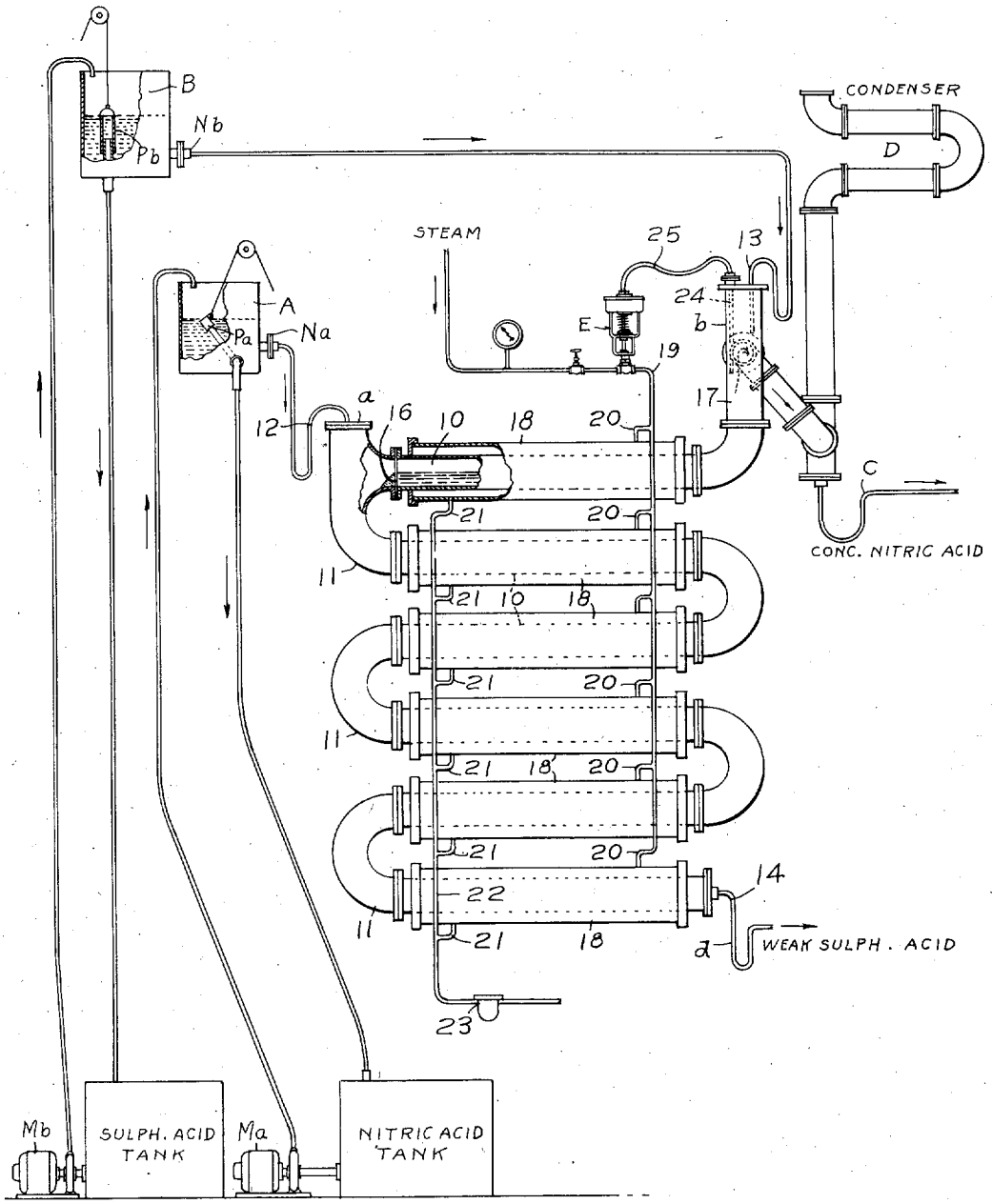
INVENTOR.
INGENUIN HECHENBLEIKNER,
BY
Ellis S. Middleton ATTORNEY.

Reissued Jan. 28, 1936

Re. 19,837

UNITED STATES PATENT OFFICE 19,837

NITRIC ACID CONCENTRATION

Ingenuin Hechenbleikner, deceased, late of Charlotte, N. C., by Chemical Construction Corporation, New York, N. Y., a corporation of Delaware, assignee Original No. 1,921,255, dated August 8, 1933, Serial No. 352,093, April 3, 1929. Application for reissue February 15, 1935, Serial No. 6,718

28 Claims. (Cl. 23—160)

This invention relates to the art of nitric acid concentration; and has special reference to the provision of an improved method of and apparatus for concentrating aqueous nitric acid by the separation of the same from an admixture of aqueous nitric acid and a dehydrating agent such as concentrated sulphuric acid.

The prime desideratum of this invention centers about the provision of an improved method of and apparatus for concentrating nitric acid of the type set forth and claimed in his copending application Serial No. 256,561, filed February 24, 1928, now Patent No. 1,818,711 the improvements pertaining more particularly to the provision of steps in the process and means in the apparatus for regulating preferably automatically the production of uniform and predetermined strengths of the sulphuric acid and the nitric acid.

In accordance with the principles of this invention, as set forth in said copending application, a mixture of aqueous nitric acid and a dehydrating agent such as sulphuric acid is continuously passed through a series of concentrating chambers or retorts so connected together that the acid mixture is caused to flow continuously in one direction from one retort chamber to the next countercurrent to the flow therein of nitric acid vapors distilled in each of the retort chambers, the distilling heat being supplied by a heating medium applied separately to each of the several retorts of the series, the arrangement of the parts and the operation of the system being such that uniformly concentrated nitric acid is produced of high strengths without contamination and without the other objections residing in the prior art air heat treatment method and without unduly diluting the sulphuric acid, as is the case with prior art steam heat treatment methods.

It has been found in the operation of the acid concentrating system of his invention that the system as a whole is sensitively dependent upon the manner in which the retort chambers are heated, and more specifically upon the heating temperatures applied to the individual retort chambers. It has been found that the strength of the discharging weak sulphuric acid will be dependent critically upon the uniformity of the mixture of the raw acids and upon the temperature at which the distilled nitric acid vapors leave the concentrator. The uniform mixture of the raw acids can be maintained by maintaining constant the strength of the raw acids and by controlling in a constant manner the feed thereof through the nozzles and into the concentrator. With the mixture thus controlled, he has determined that the strength of the discharging weak sulphuric acid will be constant provided the nitric acid vapors leave the concentrator at a constant strength. The strength of the nitric acid vapors are in turn dependent, as stated, upon the exit temperature of the nitric acid vapors. Thus an increase in temperature of the nitric acid exit vapor results in the production of a stronger nitric acid. Therefore by controlling the temperature of the nitric acid exit vapor, it becomes possible to control and regulate the strength of the concentrated nitric acid, as well as the strength of the discharging weak sulphuric acid, and these to any desired or predetermined strength.

These results he has found may be accomplished by suitably governing or controlling the heating of the individual retort chambers of the concentrator, and the provision of a method and apparatus for accomplishing this is a principal object of this present invention. Preferably these results are accomplished in the automatic operation of the system by controlling or governing the operation of the heating means for the concentrator by the exit temperatures of the nitric acid vapors, and the provision of a process of and apparatus for accomplishing the control automatically is a further prime object of this present invention.

To the accomplishment of the foregoing and such other objects and advantages as will hereinafter appear, his invention consists in the elements and their relation one to the other as hereinafter more particularly described and sought to be defined in the claims; reference being had to the accompanying drawing, which shows the preferred embodiment of his invention, and in which:

The figure is a diagrammatic flow sheet of the nitric acid concentrating system embodying the principles of his present invention.

Referring now more in detail to the drawing, the concentrating apparatus proper is shown to comprise a series of retort chambers 10, 10 which preferably are in the form of elongated horizontal pipes arranged in substantially vertical superposition, said retort chambers being connected in series or cascade by the end elbow pipes 11, 11, the uppermost or first retort chamber 10 being provided with a feed nitric acid inlet 12 and with a feed sulphuric acid inlet 13, and the last or lowermost retort chamber 10 of the series being provided with an outlet 14 for the sulphuric acid (or other dehydrating agent that may be used). The feed acid inlets 12 and 13 may feed into separated conduits *a* and *b* communicating with the uppermost retort chamber 10, although it will be understood that the nitric acid could also be entered into the conduit *b* or where the sulphuric acid from the inlet 13 enters the first pipe unit.

Each of the retort chambers 10 is constructed to provide a long and shallow receptacle for holding a shallow body of the acid admixture, the construction being designed to afford an extended surface or area of treatment having a substantial volume. This is accomplished by the provision of dams 16 arranged at the discharge end of each pipe chamber (one of said dams being shown for the uppermost chamber 10), the level of the acid admixture in each chamber being determined by the height of these dams, and the dams controlling the overflow movement of the admixture from chamber to chamber. The manner of interconnecting the chambers in cascade by the elbows 11 is such that spaces are provided in the several retort chambers above the level of the acid therein, the spaces communicating with one another so that a continuous path is provided for the flow of nitric acid vapors generated in the several chambers. This flow of nitric acid vapors is counter-current to the acid flow in the chambers, and has exit at a discharge or exit duct 17 arranged at the entrant end of the uppermost chamber 10 of the series.

The vapor exit duct 17 is connected to suitable vapor condensing apparatus generally designated as condenser D, the condensed vapors being collected and fed from the system through the pipe *c*, the flow of exit vapors and concentrated nitric acid being as indicated by the arrows in the figure. The weak sulphuric acid discharging from the outlet 14 is led away through the piping *d* in the direction also indicated by the arrow in the flow sheet of the drawing. The overflow control dams 16 with their associated connecting elbows 11 form spillways for spilling the liquid over from one retort chamber to the next lower retort chamber of the series, these spillways functioning to break up the body of the admixture treated in a retort as the mixture moves from one retort to the next.

For distilling or driving off the nitric acid vapors from the acid mixture, each of the retort chambers 10 is provided with an external heating means, and preferably each of the pipe retorts 10 is provided with a jacket 18, one jacket individual to a pipe retort, these jackets being supplied with a fluid heating medium, as for example steam in the embodiment illustrated in the drawing. The jackets 18 are preferably arranged in parallel with respect to the heat supply, each of the jackets being therefore provided with inlets 20, 20 connected to a common steam inlet pipe 19 and outlets 21, 21 connected to a common outlet pipe 22 in turn communicating with condenser 23. The use of the individual heating jackets for the retort chambers constitutes an important factor in controlling the temperatures applied to the separate retort chambers for producing the results and advantages of the present invention.

For accomplishing the results hereinbefore set forth of controlling and regulating both the strength of the concentrated nitric acid as well as the discharging weak sulphuric acid, the operation of the heating jackets 18 is predetermined and preferably automatically governed to predetermine the temperature of the exit vapors discharging from the exit duct 17. This is preferably accomplished by controlling the supply of steam into the common inlet pipe 19 by means of a control valve E, which valve is operated by the temperatures in the exit duct 17 or conduit *b* where the nitric acid vapors leave the concentrator and discharge into the condenser. The control valve E may be of a well-known make and as a separate unit does not form part of his present invention, this control comprising a regulator bulb 24 arranged in the exit conduit *b* and connected by means of a flexible pipe 25 to the control valve E. With this apparatus any change in the temperature of the exit vapors in *b* is immediately transmitted to the control valve E, which in turn regulates the flow of steam into the heating system.

The steam regulator is designed so that it can maintain a temperature of 200° to 250° F. at the exit conduit *b*, that is, at the exit of the nitric acid vapors, all depending upon the strength of the acid required. By governing the steam control valve E, any desired exit temperature between the limits specified may be obtained, and thus it is possible to control and regulate the strength of the concentrated nitric acid as well as the discharging weak sulphuric acid to any desired strength.

With the use of this automatic control, a proper equilibrium is maintained between the vapor and liquid phases of the concentrating process in that there are no changes in temperature and strength of the acids and a very high and uniform yield is obtained. Varying temperatures in the concentrator system result in varying strengths and a variable denitration. While at one moment prevailing temperature and strength may give a very good denitration, say for example .01–.02% $HNO_3$ in the sulphuric acid discharge, at another moment the strength and temperature are changed and the denitration is very incomplete, giving probably .5 to 1% $HNO_3$ in the sulphuric acid discharge. Very small changes in the composition and temperature of the discharged acid will cause large variations in the nitric acid content of the discharged sulphuric acid, this being mainly due to the disturbance of the equilibrium between the vapor and liquid phases of the process. The loss of nitric acid is therefore quite heavy, and the more uniform the exit temperature the higher the yield. With the automatic control of the present invention, the proper equilibrium is maintained, resulting in no changes in temperature and strength of the acid and in a very high and uniform yield.

Another advantage of the temperature control system of the present invention is that there is no overheating of the acid in the concentrating system, so that practically no decomposition takes place. The condensed nitric acid is therefore practically free from $NO_2$ gases even when no bleacher is used.

It has been found most suitable in the process to use a sulphuric acid of 88 to 90% strength and a nitric acid of from 40 to 60% strength and these being mixed in such proportions that the discharged weak acid has a strength of 63 to 74% $H_2SO_4$. If a temperature of 220 to 230° F. is maintained at the exit *b*, the condensate will run approximately 95 to 98% $HNO_3$. The steam pressure required to accomplish this is approximately 170 to 250 pounds depending upon the desired capacity.

The uniform mixture of the acids fed into the concentrator is controlled by governing the feed of the raw acids into the concentrator. The nitric acid is added to the concentrator at the entrant conduit *a* from the constant level tank A. The flow of the acid is controlled by the nozble "N*a*", and the regulation made by changing the level in the tank by moving the overflow pipe "P*a*" up or down. The acid is supplied by a pump "M*a*", which pumps the acid from a nitric acid supply tank to the constant level tank. The excess of acid not used in the concentrators drains back through the overflow pipe "P*a*" into the nitric acid tank. The concentrated sulphuric acid is supplied at "*b*" controlled and regulated in the same manner as the nitric acid. The arrangement can be made so that the regulators can be operated from any suitable point. Two different types of regulators for changing the level in the constant level tank are shown. In the case of the nitric acid the drain pipe for the overflow turns in a swing joint. In the case of the sulphuric acid (tank B) the overflow pipe is surrounded by a sleeve which can be moved up and down, thereby raising or lowering the level in the tank. The invention is obviously not limited only to these two ways of regulating the level in the tank, but also any other practical way may be used. The flow of the sulphuric acid is controlled by the nozzle N*b* and the regulation made by moving the overflow pipe P*b* up or down. The sulphuric acid is supplied by the pump M*b* which pumps the acid from a sulphuric acid tank to the constant level tank. The excess not used drains back through the overflow pipe P*b* into the sulphuric acid tank. The movements of both the nitric and sulphuric acids are indicated by the arrows in the flow sheet of the drawing.

The practice of the method and the operation of the apparatus of his present invention and the many advantages thereof will in the main be fully apparent from the above detailed description thereof. It will be further apparent that while his invention has been shown and described in its preferred form, that many changes and modifications may be made in the structure disclosed without departing from the spirit of his invention, as defined in the claims.

As examples of a few of the modifications that may be made, the following may be recited. Although it is preferred to separate the nitric acid inlet 12 from the sulphuric acid inlet 13, these may be arranged in juxtaposition to feed into the same inlet conduit. The arrangement shown is desirable where it is desired to maintain the uppermost retort chamber 10 filled with the concentrated sulphuric acid so that the nitric acid vapor flowing thereabove is more completely dehydrated. Where these inlets are placed in close juxtaposition, the completed dehydration of the vapors may be effected by the use of a dehydrating agent placed in the inlet conduit *b*. While there is shown the heating jackets arranged in parallel, it will be understood that these may be also arranged in series, with the steam flow therethrough running in cascade through the various jackets.

Other heating fluids than steam may be employed, although the use of steam as the heating medium is regarded as one of the important objects and advantages of the present invention. Where the heating units are individualized in the form of separate heating jackets, this as a factor in controlling the temperature of the system, the use of steam as the heating medium has been found to be accompanied with important advantages. As aforesaid, by means of the temperature control of the present invention there is no over-heating of the acid in the concentrating system so that practically no decomposition takes place. In fact, the system built in accordance with the present invention is free of decomposition troubles, a disadvantage inherent in prior concentractors. One of the reasons for this is that with steam properly regulated as described the difference in temperature between the boiling point of the discharging sulphuric acid and the applied steam is too small to cause any decomposition. Thus where the discharging acid is 74% $H_2SO_4$ and steam of 200 pounds pressure is used, the temperature difference between the boiling point of the sulphuric acid and the steam is too small to cause decomposition. Steam is also preferred because of its large heat transmission value. The concentrator can also be operated satisfactorily for producing the acid control as outlined when a steam reducing valve is substituted for the steam controlled valve, which reducing valve may be set by hand to a pressure that will give the desired exit temperatures of the nitric acid vapor. This, however, is not as advantageous as the automatic control specifically described herein.

Other changes in the apparatus and the process steps may be made without departing from the spirit of the invention, as defined in the following claims.

What is claimed is:

1. The process of concentrating aqueous nitric acid to a desired predetermined concentration which consists in continuously passing aqueous nitric acid in admixture with a dehydrating agent through a series of retort chambers connected in cascade for a continuous liquid flow in one direction and for a continuous gaseous or vapor flow in the reverse direction, of heating said retort chambers sufficiently to effect a driving-off in said retort chambers of the nitric acid as nitric acid vapor, the nitric acid vapor flow through the retort chambers being in a direction opposite to the liquid flow therethrough, and of so regulating the heating of said retort chambers as to predetermine the exit temperature of said nitric acid vapor.

2. The process of concentrating aqueous nitric acid which consists in continuously passing aqueous nitric acid in admixture with a dehydrating agent through a series of retort chambers connected in cascade for a continuous liquid flow in one direction and for a continuous gaseous or vapor flow in the reverse direction, of heating said retort chambers sufficiently to effect a driving-off in said retort chambers of the nitric acid as nitric acid vapor, the nitric acid vapor flow through the retort chambers being in a direction opposite to the liquid flow therethrough, and of automatically regulating the heating of said retort chambers in response to changes in the temperature of the nitric acid vapor leaving the same as to tend to maintain the exit temperature of said nitric acid vapor at a predetermined value.

3. The process of concentrating aqueous nitric acid to a desired predetermined strength which consists in continuously passing aqueous nitric acid in admixture with a concentrated sulphuric acid through a series of retort chambers connected in cascade for a continuous liquid flow in one direction and for a continuous gaseous or vapor flow in the reverse direction, of heating said retort chambers externally sufficiently to effect a driving-off in said retort chambers of the nitric acid as nitric acid vapor, the nitric acid vapor flowing from chamber to chamber countercurrent to the sulphuric acid flow therethrough, and of so regulating the heating of said retort chambers as to maintain the exit temperature of said nitric acid vapor at a uniform value corresponding to the desired predetermined strength of nitric acid.

4. The process of concentrating aqueous nitric acid which consists in continuously passing aqueous nitric acid in admixture with a concentrated sulphuric acid through a series of retort chambers connected in cascade for a continuous liquid flow in one direction and for a continuous gaseous or vapor flow in the reverse direction, of heating said retort chambers externally sufficiently to effect a driving-off in said retort chambers of the nitric acid as nitric acid vapor, the nitric acid vapor flowing from chamber to chamber countercurrent to the sulphuric acid flow therethrough, and of automatically regulating the heating of said retort chambers in response to changes in the temperature of the nitric acid vapor leaving the same as to tend to maintain the exit temperature of said nitric acid vapor at a predetermined value whereby uniform and predetermined strengths of sulphuric and nitric acid are produced.

5. The process of concentrating aqueous nitric acid which consists in continuously passing aqueous nitric acid in admixture with a dehydrating agent through a series of retort chambers connected in cascade for a continuous liquid flow in one direction and for a continuous gaseous or vapor flow in the reverse direction, of conducting a fluid heating medium to and externally of said retort chambers for heating the same sufficiently to effect a driving-off in said retort chambers of the nitric acid as nitric acid vapor, the nitric acid flow through the retort chambers being countercurrent to the liquid flow therethrough, and of regulating the heating of said retort chambers to maintain the exit temperature of said nitric acid vapor at a predetermined desired value.

6. The process of concentrating aqueous nitric acid which consists in continuously passing aqueous nitric acid in admixture with a concentrated sulphuric acid through a series of retort chambers connected in cascade for a continuous liquid flow in one direction and for a continuous gaseous or vapor flow in the reverse direction, of conducting a heating fluid around and confining the same closely to the exteriors of said retort chambers to heat said chambers externally sufficiently to effect a driving-off in said retort chambers of the nitric acid as nitric acid vapor, the nitric acid vapor flowing from chamber to chamber countercurrent to the sulphuric acid flow therethrough, and of regulating the heating of said retort chambers to maintain the exit temperature of said nitric acid vapor whereby uniform and predetermined strengths of sulphuric acid and nitric acid are produced.

7. The process of concentrating aqueous nitric acid which consists in continuously passing aqueous nitric acid in admixture with a concentrated sulphuric acid through a series of retort chambers connected in cascade for a continuous liquid flow in one direction and for a continuous gaseous or vapor flow in the reverse direction, of conducting a heating fluid independently around and confining the same closely to the exteriors of said retort chambers to heat said chambers externally sufficiently to effect a driving-off in said retort chambers of the nitric acid as nitric acid vapor, the nitric acid vapor flowing from chamber to chamber countercurrent to the sulphuric acid flow therethrough, and of automatically regulating the heating of said retort chambers in response to changes in the temperature of the nitric acid vapor leaving the same as to tend to maintain the exit temperature of said nitric acid vapor at a predetermined value, whereby uniform and predetermined strengths of sulphuric acid and nitric acid are produced.

8. The process of concentrating aqueous nitric acid which consists in admixing the same with a dehydrating agent in a retort chamber, in heating said retort chamber sufficiently to effect a driving-off of the nitric acid as nitric acid vapor, and of so regulating the heating of said retort chamber that the exit temperature of said nitric acid vapor has a predetermined value corresponding to the desired concentration.

9. The process of concentrating aqueous nitric acid which consists in admixing the aqueous nitric acid with a concentrated sulphuric acid in a retort chamber, in heating said retort chamber externally sufficiently to effect a driving-off of the nitric acid as nitric acid vapor, the nitric acid vapor flowing from the chamber counter current to the sulphuric acid flow therethrough, and of automatically regulating the heating of said retort chamber in response to changes in the temperature of the nitric acid vapor leaving the same as to tend to maintain the exit temperature of said nitric acid vapor at a predetermined value whereby uniform and predetermined strengths of sulphuric acid and nitric acid are produced.

10. In apparatus for separating nitric acid from an admixture of aqueous nitric acid and a dehydrating agent comprising a plurality of retort chambers, means connecting the chambers in cascade for liquid flow in one direction and for gaseous or vapor flow in the reverse direction, means for supplying a heating medium externally to said chambers, feed inlets for the acid and dehydrating agent for the series of chambers, an outlet for the dehydrating agent for the series of chambers, an outlet for the dehydrating agent associated with the last chamber of the series, an exit duct for the nitric acid vapors associated with said series of chambers, and means for so automatically regulating and varying the operation of the heating medium as to predetermine the exit temperature of said nitric acid vapor.

11. The apparatus of claim 10 in which the regulating means comprises temperature responsive mechanism interconnecting the nitric acid exit vapor duct with the means for supplying the heating medium whereby the heating of said chambers is controlled automatically by the temperature of the exit nitric acid vapors.

12. In apparatus for separating aqueous nitric acid from an admixture of aqueous nitric acid and sulphuric acid comprising a plurality of retort chambers, each adapted to hold a shallow body of the admixture, means connecting the chambers in cascade for liquid flow communication, the spaces in said chambers above the shallow bodies of the liquid admixture and the said connecting means defining a continuous path for the flow of nitric acid vapors, means for supplying a heating medium externally to said chamber sufficient to drive off the nitric acid as nitric acid vapors, feed acid inlets for the series of chambers, an outlet for the diluted sulphuric acid associated with the last chamber of the series, an exit duct for the nitric acid vapors associated with the first chamber of the series, and means for so regulating the operation of said heating medium as to predetermine the exit temperature of said nitric acid vapors whereby uniform and predetermined strength of sulphuric acid and nitric acid are produced.

13. In apparatus for separating aqueous nitric acid from an admixture of aqueous nitric acid and sulphuric acid comprising a plurality of retort chambers arranged in substantially vertical formation, means connecting the chambers in cascade for liquid flow in one direction and for gaseous or vapor flow in the reverse direction, heating jackets for said retort chambers, means for supplying a fluid heating medium to said jackets for externally heating said chambers, a feed acid inlet for the series of chambers, an outlet for the sulphuric acid associated with the last chamber of the series, an exit duct for the nitric acid vapors associated with the first chamber of the series, and means controlled by the temperature of the exit nitric acid vapors for regulating automatically the supplying of the heating medium to said jackets.

14. An apparatus for separating aqueous nitric acid from an admixture of aqueous nitric acid and a dehydrating agent comprising a plurality of retort chambers arranged in substantially vertical formation, each chamber being adapted to hold a shallow body of the admixture, means connecting the chambers in cascade for liquid flow communication, heating jackets for said retort chambers, means for supplying a fluid heating medium to said jackets for externally heating said chambers, feed acid inlets for the series of chambers, an outlet for the dehydrating agent associated with the last chamber of the series, an exit duct for the nitric acid vapors associated with said series of chambers, and means controlled by the temperature in said nitric acid vapor exit duct for automatically regulating the supplying of the heating medium to said jackets.

15. An apparatus for separating aqueous nitric acid from an admixture of aqueous nitric acid and a dehydrating agent comprising a retort chamber, means for heating said retort chamber sufficient to effect a driving off of the nitric acid as nitric acid vapor, and means for regulating the heating of said retort chamber to predetermine the exit temperature of said nitric acid vapor.

16. An apparatus for separating aqueous nitric acid from an admixture of aqueous nitric acid and sulphuric acid comprising a retort chamber, means for heating said retort chamber sufficient to effect a driving off of the nitric acid as nitric acid vapor, and means for regulating the heating of said retort chamber governed by the exit temperature of said nitric acid vapor whereby uniform and predetermined strengths of nitric acid and sulphuric acid are produced.

17. An apparatus for separating aqueous nitric acid from an admixture of aqueous nitric acid and sulphuric acid comprising a series of pipe retort chambers each adapted to hold a shallow body of the admixture to be concentrated, elbow connecting members joining the pipe chambers for continuous liquid and vapor flow inter-communication, each of said pipe retort chambers being provided at its discharge end with means determining the level of the liquid treated in a retort chamber and controlling the overflow movement of the liquid from one retort chamber to the next retort chamber of the series, each such means and its associated connecting elbow defining a spillway for spilling the liquid over from one retort chamber to the next lower retort chamber of the series, external heating means individual to each of the retort chambers for heating the same, and means for controlling the operation of said heating means governed by the exit temperature of said vapor whereby uniform and predetermined strengths of sulphuric acid and nitric acid are produced.

18. An apparatus for separating aqueous nitric acid from an admixture of aqueous nitric acid and sulphuric acid comprising a series of retort chambers each adapted to hold a shallow body of the admixture, means connecting the chambers in cascade for continuous liquid flow in one direction and for continuous vapor flow in the opposite direction, external heating means individual to each of the retort chambers for heating the same, and means for automatically regulating the operation of said heating means in response to changes in the temperature of said vapor.

19. A nitric acid concentrating apparatus comprising a series of retort chambers each adapted to hold a shallow body of a liquid to be concentrated, means connecting the chambers in cascade for continuous liquid and vapor flow communication, a heating jacket for each retort chamber of the series, means for supplying a fluid heating medium to said jackets for externally heating said chambers, and means for so regulating the supplying of the heating medium to said jackets as to predetermine the exit temperature of said vapor.

20. A nitric acid concentrating apparatus comprising a series of pipe-shaped retort chambers each adapted to hold a long shallow body of a liquid to be concentrated, means connecting the chambers in cascade for continuous liquid flow communication, the spaces in said chambers above the shallow bodies of the liquid and the said connecting means defining a continuous path for the flow of vapors evaporated from said liquid, heating jackets for said retort chambers, a heating jacket being individual to each retort chamber of the series, means for supplying a fluid heating medium to said jackets for externally heating said chambers, said jackets being arranged in parallel with respect to the fluid heating medium supply, and means for controlling the supply of the heating medium governed by the exit temperature of said vapors.

21. A nitric acid concentrating apparatus comprising a series of retort chambers each adapted to hold a body of a mixture of nitric and sulphuric acids means connecting the chambers in cascade for continuous liquid and vapor flow communication, a heating jacket for each retort chamber of the series, means for circulating steam through said heating jackets for externally heating said chambers, and means for controlling the steam heating medium so that the temperature difference between the applied steam in said jackets and the boiling point of the sulphuric acid discharging from the apparatus is small enough to prevent decomposition of the acid from taking place.

22. A nitric acid concentrating apparatus comprising a series of pipe-shaped retort chambers each adapted to hold a long shallow body of a mixture of nitric and sulphuric acids, means connecting the chambers in cascade for continuous liquid and vapor flow communication, a heating jacket for each retort chamber of the series, means for circulating steam through said heating jackets for externally heating said chambers, and means for so controlling the steam heating medium in response to the temperature of the nitric acid vapor as to tend to keep the vapor at a predetermined temperature corresponding to substantially complete denitration, while at the same time keeping the temperature difference between the applied steam in said jackets and the boiling point of the sulphuric acid discharging from the apparatus small enough to prevent decomposition of the acid from taking place.

23. A nitric acid concentrating apparatus comprising a series of pipe-shaped retort chambers each adapted to hold a long shallow body of a mixture of nitric and sulphuric acids, means connecting the chambers in cascade, a heating jacket for each retort chamber of the series, means for circulating steam through said heating jackets for externally heating said chambers, means to feed sulphuric acid to the concentrator at a predetermined rate, means to feed the nitric acid to be concentrated to the concentrator at a predetermined rate, and means for controlling the steam heating medium so that the temperature difference between the applied steam in said jackets and the boiling point of the sulphuric acid discharging from the apparatus is small enough to prevent decomposition of the acid from taking place.

24. The process of concentrating nitric acid which comprises passing a mixture of nitric acid and a dehydrating agent down through a dehydrating zone, driving off therefrom strong nitric acid vapors, passing the residual mixture still containing some nitric acid through a series of boiling vessels forming a cascade, vaporizing weak nitric acid in the cascade, and retaining all the weak nitric vapors from the boiling vessels in the system by returning them to the dehydrating zone.

25. The process of concentrating nitric acid which comprises passing a mixture of nitric acid and a dehydrating agent down through a dehydrating zone, driving off therefrom strong nitric acid vapors, passing the residual mixture still containing some nitric acid through a series of boiling vessels forming a cascade, and retaining all the weak nitric vapors in the system by returning them to the dehydrating zone through the series of boiling vessels in counter-current contact flow with the oncoming mixture of liquids.

26. The process of concentrating nitric acid which comprises passing a mixture of nitric acid and a dehydrating agent down through a dehydrating zone, driving off therefrom strong nitric acid vapors, passing the residual mixture still containing some nitric acid through a series of boiling vessels forming a cascade, and retaining all the most dilute nitric acid vapors together with the stronger vapors from the uppermost boiling vessels in the system by returning them to the dehydrating zone in counter-current contact flow with the oncoming mixture of liquids.

27. The process of concentrating nitric acid which comprises passing a mixture of nitric acid and a dehydrating agent down through a dehydrating zone, driving off therefrom strong nitric acid vapors, passing the residual mixture still containing some nitric acid through a series of boiling vessels, vaporizing weak nitric acid in the boiling vessels, an retaining all the weak nitric acid vapors from the boiling vessels in the system by returning them to the dehydrating zone.

28. The process of concentrating nitric acid which comprises passing a mixture of nitric acid and a dehydrating agent down through a dehydrating zone, removing from said zone strong nitric acid vapors, passing the mixture through a series of boiling vessels forming a cascade, vaporizing weak nitric acid in the cascade, and retaining all the weak nitric vapors from the boiling vessels in the system by returning them to the dehydrating zone.

CHEMICAL CONSTRUCTION CORPORATION,
*Assignee of Ingenuin Hechenbleikner, Deceased,*
By THOMAS C. OLIVER,
*Vice-President.*